(12) United States Patent
Zhang et al.

(10) Patent No.: US 11,347,104 B2
(45) Date of Patent: May 31, 2022

(54) BACKLIGHT MODULE, METHOD OF MANUFACTURING BACKLIGHT MODULE, AND LIQUID CRYSTAL DISPLAY APPARATUS

(71) Applicants: CHONGQING BOE OPTOELECTRONICS TECHNOLOGY CO., LTD., Chongqing (CN); BOE TECHNOLOGY GROUP CO., LTD., Beijing (CN)

(72) Inventors: Chaojie Zhang, Beijing (CN); Liang Gao, Beijing (CN); Sijun Lei, Beijing (CN); Yansheng Sun, Beijing (CN); Dengqian Li, Beijing (CN)

(73) Assignees: CHONGQING BOE OPTOELECTRONICS TECHNOLOGY CO., LTD., Chongqing (CN); BOE TECHNOLOGY GROUP CO., LTD., Beijing (CN)

( * ) Notice: Subject to any disclaimer, the term of this patent is extended or adjusted under 35 U.S.C. 154(b) by 47 days.

(21) Appl. No.: 16/643,536

(22) PCT Filed: Aug. 30, 2019

(86) PCT No.: PCT/CN2019/103713
§ 371 (c)(1),
(2) Date: Feb. 29, 2020

(87) PCT Pub. No.: WO2020/088081
PCT Pub. Date: May 7, 2020

(65) Prior Publication Data
US 2021/0223628 A1 Jul. 22, 2021

(30) Foreign Application Priority Data
Nov. 1, 2018 (CN) .......................... 201811295414.6

(51) Int. Cl.
*G02F 1/1335* (2006.01)
*G02F 1/13357* (2006.01)

(52) U.S. Cl.
CPC .. *G02F 1/133608* (2013.01); *G02F 1/133524* (2013.01)

(58) Field of Classification Search
CPC ..................... G02F 1/133608; G02F 1/133524
See application file for complete search history.

(56) References Cited

U.S. PATENT DOCUMENTS

2014/0092630 A1\* 4/2014 Franklin .............. G02B 6/0031
362/609
2016/0178836 A1\* 6/2016 Kim ..................... G02B 6/0088
362/606

FOREIGN PATENT DOCUMENTS

| CN | 102565921 A | 7/2012 |
| CN | 204807879 U | 11/2015 |

(Continued)

OTHER PUBLICATIONS

International Search Report and Written Opinion dated Nov. 28, 2019, for corresponding PCT Application No. PCT/CN2019/103713.

*Primary Examiner* — Donald L Raleigh
(74) *Attorney, Agent, or Firm* — Kinney & Lange, P.A.

(57) ABSTRACT

Embodiments of the present disclosure provide a backlight module, a liquid crystal display apparatus, and a method of manufacturing the backlight module. The backlight module includes: a support plate including a first surface; a light source fixed to the first surface of the support plate, having a light exit face, and configured to emit a light from the light exit face; an adhesion assembly disposed on the first surface of the support plate, and including at least one adhesion part extending from the light exit face of the light source in a direction away from the light source; and a light guide plate (Continued)

including: a bottom surface adhered to the first surface of the support plate through the at least one adhesion part of the adhesion assembly; a top surface located opposite to the bottom surface and serving as a light exit face of the light guide plate; and a side surface surrounding the bottom surface and the top surface. A portion of the side surface serves as a light entry face of the light guide plate.

17 Claims, 5 Drawing Sheets

(56) References Cited

FOREIGN PATENT DOCUMENTS

| | | | | | |
|---|---|---|---|---|---|
| CN | 106226952 | A | | 12/2016 | |
| CN | 206301059 | U | | 7/2017 | |
| CN | 108132562 | A | * | 6/2018 | ........... G02F 1/1335 |
| CN | 108132562 | A | | 6/2018 | |
| CN | 207780432 | U | | 8/2018 | |
| CN | 207976672 | U | * | 10/2018 | ........... G02F 1/1335 |
| CN | 207976672 | U | | 10/2018 | |
| KR | 20110026958 | A | | 3/2011 | |

* cited by examiner

BACKLIGHT MODULE, METHOD OF MANUFACTURING BACKLIGHT MODULE, AND LIQUID CRYSTAL DISPLAY APPARATUS

CROSS-REFERENCE TO RELATED APPLICATION(S)

This application is a Section 371 National Stage Application of International Application No. PCT/CN2019/103713, filed on Aug. 30, 2019, entitled "BACKLIGHT MODULE, METHOD OF MANUFACTURING BACKLIGHT MODULE, AND LIQUID CRYSTAL DISPLAY APPARATUS", which has not yet published, which claims priority to Chinese Patent Application No. 201811295414.6, filed on Nov. 1, 2018, incorporated herein by reference in their entirety.

TECHNICAL FIELD

Embodiments of the present disclosure relate to the field of display technology, and particularly to a backlight module, a liquid crystal display apparatus, and a method of manufacturing the backlight module.

BACKGROUND

A liquid crystal display apparatus includes a backlight module. In the liquid crystal display apparatus, the backlight module is disposed on a light incidence side of a liquid crystal display panel to provide the liquid crystal display panel with a backlight, thereby achieving a liquid crystal display.

SUMMARY

In accordance with an aspect of embodiments of the present disclosure, there is provided a backlight module including: a support plate including a first surface; a light source fixed to the first surface of the support plate, having a light exit face, and configured to emit a light from the light exit face; an adhesion assembly disposed on the first surface of the support plate, and including at least one adhesion part extending from the light exit face of the light source in a direction away from the light source; and a light guide plate including: a bottom surface adhered to the first surface of the support plate through the at least one adhesion part of the adhesion assembly; a top surface located opposite to the bottom surface and serving as a light exit face of the light guide plate; and a side surface surrounding the bottom surface and the top surface, wherein a portion of the side surface serves as a light entry face of the light guide plate, and the light emitted by the light source enters the light guide plate through the light entry face of the light guide plate.

Optionally, in some embodiments, the light entry face of the light guide plate is in direct contact with the light exit face of the light source.

Optionally, in some embodiments, the adhesion assembly includes a plurality of the adhesion parts arranged in a first direction, the light source includes a plurality of light emitting elements arranged in the first direction, and when viewed in a second direction perpendicular to the first direction, each of the plurality of adhesion parts is located between two adjacent ones of the plurality of light emitting elements.

Optionally, in some embodiments, each of the plurality of light emitting elements is configured to emit a light beam, an orthogonal projection of the light beam on the bottom surface of the light guide plate has a first side and a second side, and one of the first side and the second side of the orthogonal projection of the light beam makes a predetermined angle with the other of the first side and the second side of the orthogonal projection of the light beam, and the predetermined angle is a beam angle of the light emitting element, and each of the plurality of adhesion parts has a shape of an isosceles triangle, a base of the isosceles triangle is closer to the light entry face of the light guide plate than a vertex angle of the isosceles triangle, and the vertex angle of the isosceles triangle is equal to the beam angle of the light emitting element.

Optionally, in some embodiments, each of the plurality of light emitting elements is configured to emit a light beam, and the plurality of adhesion parts are configured such that an orthogonal projection of each of the plurality of adhesion parts on the bottom surface of the light guide plate is located outside orthogonal projections of the light beams of the plurality of light emitting elements on the bottom surface of the light guide plate.

Optionally, in some embodiments, the adhesion assembly further includes a connection part connecting the plurality of adhesion parts.

Optionally, in some embodiments, the connection part includes a first strip portion extending in the first direction, and a plurality of second portions extending from the first strip portion to the plurality of adhesion parts and connected to the plurality of adhesion parts, respectively, and the connection part is adhered to the support plate.

Optionally, in some embodiments, the plurality of light emitting elements are located between the first strip portion of the connection part and the light entry face of the light guide plate, and are arranged alternately with the plurality of second portions of the connection part.

Optionally, in some embodiments, a material of the adhesion assembly includes an adhesive tape or an adhesive.

Optionally, in some embodiments, the backlight module further includes: a reflection element disposed on a side of the light guide plate facing towards the support plate and configured to reflect a light, exiting from the bottom surface of the light guide plate, into the light guide plate through the bottom surface.

Optionally, in some embodiments, the backlight module further includes: a back plate, wherein the support plate includes a second surface located opposite to the first surface and slidably disposed on a surface of the back plate.

Optionally, in some embodiments, the support plate includes a circuit board, and the light source includes a plurality of light emitting elements fixed to the circuit board so as to be supplied with an electric power.

In accordance with another aspect of embodiments of the present disclosure, there is provided a liquid crystal display apparatus including: the backlight module of any one of the above embodiments; and a liquid crystal display panel having a light entry face, wherein the light exit face of the light guide plate of the backlight module faces towards the light entry face of the liquid crystal display panel.

In accordance with still another aspect of embodiments of the present disclosure, there is provided a method of manufacturing a backlight module, including: providing a support plate including a first surface; providing a light source having a light exit face and configured to emit a light from the light exit face, and fixing the light source to the first surface of the support plate; providing a light guide plate, the light guide plate including: a bottom surface; a top surface located opposite to the bottom surface and serving as a light exit face of the light guide plate; and a side surface surrounding the bottom surface and the top surface, a portion of the side surface serving as a light entry face of the light guide plate, and the light emitted by the light source entering the light guide plate through the light entry face of the light guide plate; disposing an adhesion assembly on the first surface of the support plate, the adhesion assembly including at least one adhesion part, and the at least one adhesion part extending from the light exit face of the light source in a direction away from the light source; or disposing the adhesion assembly on the bottom surface of the light guide plate, the at least one adhesion part of the adhesion assembly extending from the light entry face of the light guide plate in a direction away from the light entry face; and adhering the bottom surface of the light guide plate to the first surface of the support plate through the at least one adhesion part of the adhesion assembly.

Optionally, in some embodiments, the light entry face of the light guide plate is in direct contact with the light exit face of the light source.

Optionally, in some embodiments, the adhesion assembly includes a plurality of the adhesion parts arranged in a first direction, the light source includes a plurality of light emitting elements arranged in the first direction, and when viewed in a second direction perpendicular to the first direction, each of the plurality of adhesion parts is located between two adjacent ones of the plurality of light emitting elements.

Optionally, in some embodiments, each of the plurality of light emitting elements is configured to emit a light beam, an orthogonal projection of the light beam on the bottom surface of the light guide plate has a first side and a second side, and one of the first side and the second side of the orthogonal projection of the light beam makes a predetermined angle with the other of the first side and the second side of the orthogonal projection of the light beam, and the predetermined angle is a beam angle of the light emitting element, and each of the plurality of adhesion parts has a shape of an isosceles triangle, a base of the isosceles triangle is closer to the light entry face of the light guide plate than a vertex angle of the isosceles triangle, and the vertex angle of the isosceles triangle is equal to the beam angle of the light emitting element.

Optionally, in some embodiments, each of the plurality of light emitting elements is configured to emit a light beam, and the plurality of adhesion parts are configured such that an orthogonal projection of each of the plurality of adhesion parts on the bottom surface of the light guide plate is located outside orthogonal projections of the light beams of the plurality of light emitting elements on the bottom surface of the light guide plate.

Optionally, in some embodiments, the adhesion assembly further includes a connection part connecting the plurality of adhesion parts.

Optionally, in some embodiments, the connection part includes a first strip portion extending in a first direction, and a plurality of second portions extending from the first strip portion to the plurality of adhesion parts and connected to the plurality of adhesion parts, respectively, and the connection part is adhered to the support plate.

Optionally, in some embodiments, the plurality of light emitting elements are located between the first strip portion of the connection part and the light entry face of the light guide plate, and are arranged alternately with the plurality of second portions of the connection part.

Optionally, in some embodiments, the method further includes: disposing, on a side of the light guide plate facing towards the support plate, a reflection element configured to reflect a light, exiting from the bottom surface of the light guide plate, into the light guide plate through the bottom surface.

Optionally, in some embodiments, the method further includes: providing a back plate, wherein the support plate includes a second surface located opposite to the first surface and slidably disposed on a surface of the back plate.

Optionally, in some embodiments, providing the support plate and providing the light source collectively include: providing a light source module, the light source module including: a circuit board serving as the support plate; and a plurality of light emitting elements serving as the light source and fixed to the circuit board to be supplied with an electric power.

BRIEF DESCRIPTION OF THE DRAWINGS

In order to describe embodiments of the present disclosure or technical solutions in the prior art more clearly, accompanying drawings required for describing the embodiments or the prior art will be simply explained as below. Apparently, the accompanying drawings for the following description are only some embodiments of the present disclosure. Those skilled in the art also could derive other accompanying drawings from these accompanying drawings without making a creative work.

DETAILED DESCRIPTION

Figure 1:
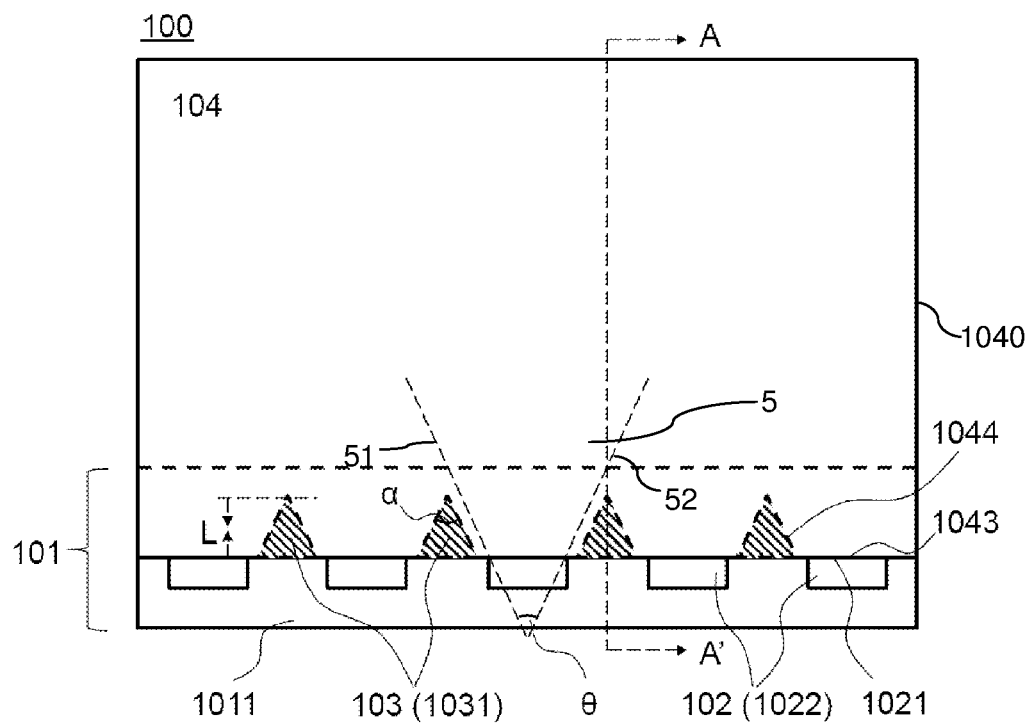
FIG. 1 is a top view of a backlight module according to an embodiment of the present disclosure.

A clear and complete description of technical solutions in embodiments of the present disclosure will be made as below in conjunction with the accompanying drawings in the embodiments of the present disclosure. Apparently, the described embodiments are some of the embodiments of the present disclosure rather than all of the embodiments of the present disclosure. All other embodiments derived by those skilled in the art based on the embodiments of the present disclosure without making a creative work shall fall within the protection scope of the present disclosure.

In accordance with an aspect of embodiments of the present disclosure, there is provided a backlight module 100. Referring to FIGS. 1-3 and 5-7, the backlight module 100 according to the embodiment of the present disclosure includes: a support plate 101 including a first surface 1011; a light source 102 fixed to the first surface 1011 of the support plate 101, having a light exit face 1021, and configured to emit a light from the light exit face 1021; an adhesion assembly 103 disposed on the first surface 1011 of the support plate 101, and including at least one adhesion part 1031 extending from the light exit face 1021 of the light source 102 in a direction away from the light source 102; and a light guide plate 104 including: a bottom surface 1041 adhered to the first surface 1011 of the support plate 101 through the at least one adhesion part 1031 of the adhesion assembly 103; a top surface 1042 located opposite to the bottom surface 1041 and serving as a light exit face of the light guide plate 104; and a side surface 1040 surrounding the bottom surface 1041 and the top surface 1042. A portion of the side surface 1040 serves as a light entry face 1043 of the light guide plate 104, and the light emitted by the light source 102 enters the light guide plate 104 through the light entry face 1043 of the light guide plate 104. For example, a material of the adhesion assembly 103 includes an adhesive tape or an adhesive.

In some embodiments of the present disclosure, referring to FIGS. 1-3, 5 and 7, the light entry face 1043 of the light guide plate 104 is in direct contact with the light exit face 1021 of the light source 102.

Figure 2:
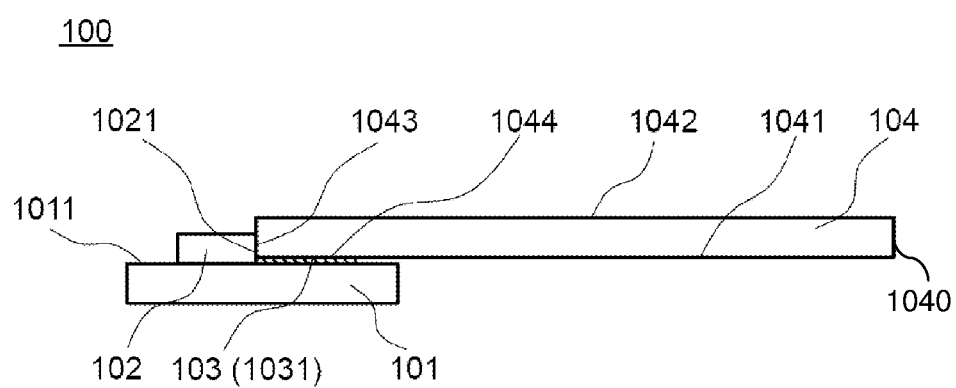
FIG. 2 is a sectional view of the backlight module taken along the line AA' in FIG. 1.
Figure 3:
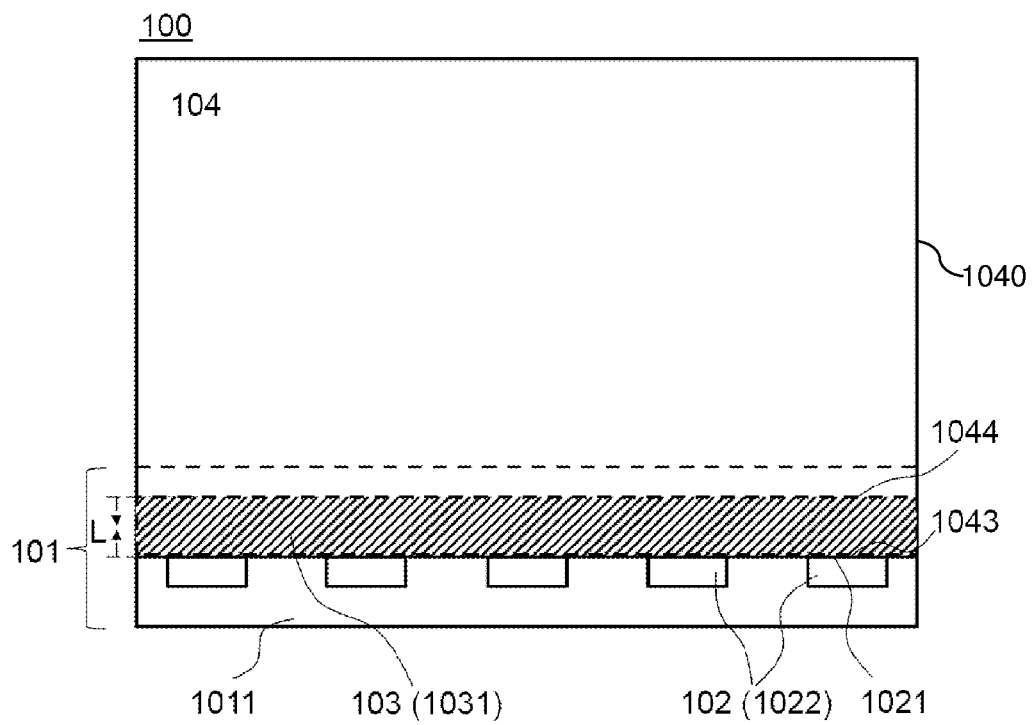
FIG. 3 is a top view of a backlight module according to another embodiment of the present disclosure.

In accordance with an example of the present disclosure, there is provided a backlight module. FIG. 1 is a top view of a backlight module according to an embodiment of the present disclosure. FIG. 2 is a sectional view of the backlight module taken along the line AA' in FIG. 1. FIG. 3 is a top view of a backlight module according to another embodiment of the present disclosure.

As shown in FIGS. 1-3, the backlight module 100 includes: a support plate 101 including a first surface 1011; a light source 102 and an adhesion assembly 103 disposed on the first surface 1011, the adhesion assembly 103 including at least one adhesion part 1031, and each adhesion part 1031 extending from a light exit face 1021 of the light source 102 in a direction away from the light source 102; and a light guide plate 104 including: a bottom surface 1041; a top surface 1042 opposite to the bottom surface 1041; and a side surface 1040 surrounding the bottom surface and the top surface. A portion of the side surface 1040 serves as a light entry face 1043 of the light guide plate, and the top surface 1042 serves as a light exit face of the light guide plate 104. The bottom surface 1041 of the light guide plate 104 is adhered to the first surface 1011 of the support plate 101 through the at least one adhesion part 1031, and the light entry face 1043 of the light guide plate 104 is in direct contact with the light exit face 1021 of the light source 102.

In the embodiments of the present disclosure, each adhesion part extends from the light exit face of the light source in the direction away from the light source, the bottom surface of the light guide plate is adhered to the first surface of the support plate 101 through the at least one adhesion part, and the light entry face of the light guide plate is in direct contact with the light exit face of the light source. With the above arrangement, an adhesion region (indicated by the reference numeral 1044 in FIGS. 1-3, 5 and 7) where the light guide plate is in contact with the adhesion assembly can be as close to the light exit face of the light source as possible. Thereby, if the light entry face of the light guide plate is displaced, it will drive the light exit face of the light source to be displaced. Thereby, when the light guide plate is deformed due to a temperature variation or aging, the deformation will not change a relative position between the light entry face of the light guide plate and the light source. Thereby, a luminance of the backlight module is increased as much as possible, and a light attenuation caused by aging is reduced.

Figure 4A:
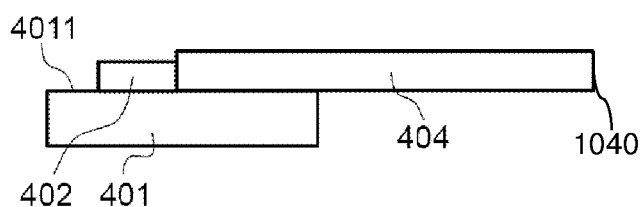
FIG. 4a is a schematic view showing a structure of the backlight module, in which a light guide plate is slidably disposed on a first surface of a support plate.
Figure 4B:
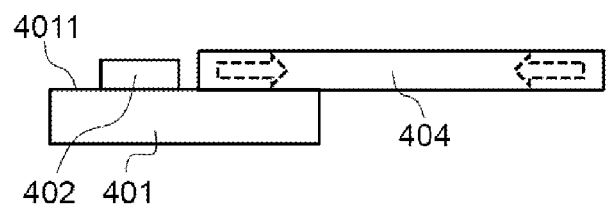
FIG. 4b is a schematic view showing a structure of the backlight module shown in FIG. 4a subsequent to a temperature variation/aging.

For example, as shown in FIG. 4*a*, the light guide plate 404 only abuts against the light exit face of the light source 402, but is not adhered to the first surface 4011 of the support plate 401 in the above arrangement (i.e. the light guide plate 404 is slidably disposed on the first surface 4011 of the support plate 101). In this case, as shown in FIG. 4*b*, when the light guide plate 404 is deformed due to aging, the relative position between the light guide plate 404 and the light source 402 will be apparently changed.

In some embodiments, referring to FIGS. 1-3, 5 and 7, the support plate 101 may be a structure such as a circuit board or a flexible printed circuit (FPC) so as to provide the light source with a support and/or an electric power. The light exit face 1021 of the light source 102 is substantially perpendicular to the first surface 1011 of the support plate 101.

Figure 5:
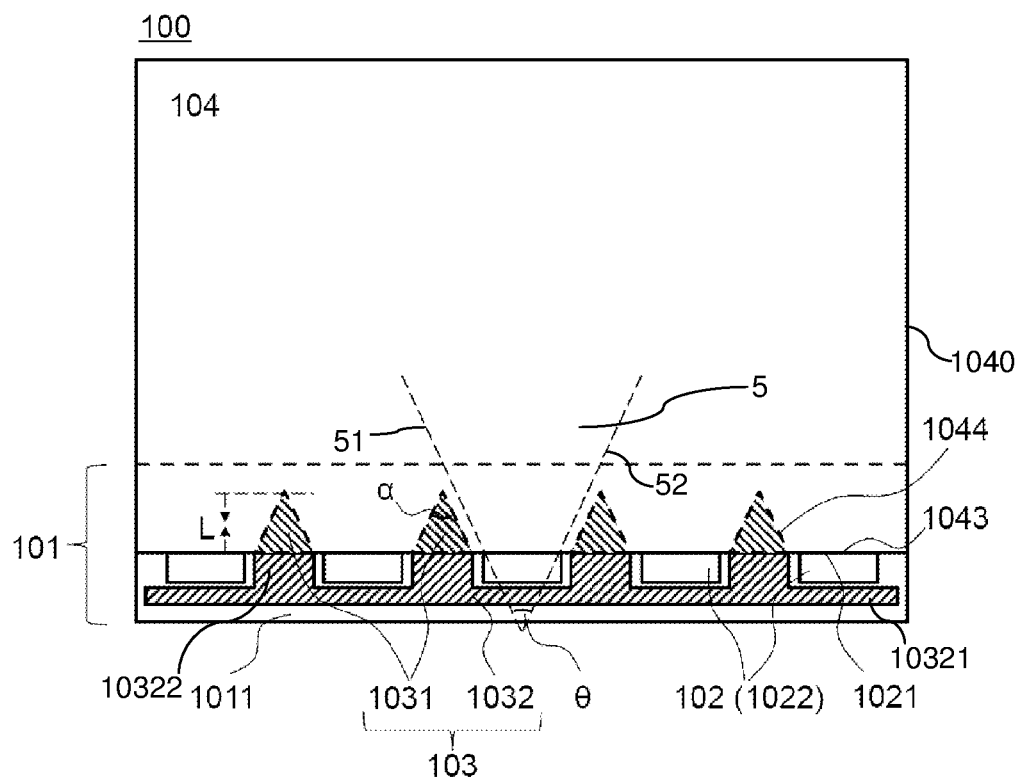
FIG. 5 is a top view of a backlight module according to a further embodiment of the present disclosure.

Optionally, as shown in FIGS. 1 and 5, in some embodiments, the adhesion assembly 103 includes a plurality of adhesion parts 1031, the light source 102 includes a plurality of light emitting elements 1022, and each of the plurality of adhesion parts 1031 corresponds in position to an interval between two adjacent ones of the plurality of light emitting elements 1022.

Optionally, in some embodiments, a surface of the adhesion part facing towards the light guide plate may be an adhesive surface. Of course, a surface of the adhesion part facing towards the support plate may also be an adhesive surface. In this case, the adhesion part (or the adhesion assembly) may be made of a double-side adhesive tape. With the above arrangement, a bonding between the light guide plate and the first surface of the support plate 101 is more stable. Each of the plurality of adhesion parts corresponds in position to the interval between two adjacent ones of the plurality of light emitting elements. Therefore, light beams emitted by the light emitting elements will not be substantially irradiated on the adhesion parts, reducing a loss of light. Of course, as shown in FIG. 3, the light guide plate 104 may also be bonded to the first surface 1011 of the support plate 101 by means of separate adhesion parts 1031.

Optionally, in some embodiments of the present disclosure, referring to FIGS. 1, 3, and 5-7, the adhesion assembly 103 includes a plurality of adhesion parts 1031 arranged in a first direction, the light source 102 includes a plurality of light emitting elements 1022 arranged in the first direction, and when viewed in a second direction perpendicular to the first direction, each of the plurality of adhesion parts 1031 is located between two adjacent ones of the plurality of light emitting elements 1022.

Optionally, in some embodiments of the present disclosure, referring to FIGS. 1 and 5, each of the plurality of light emitting elements 1022 is configured to emit a light beam 5, and the plurality of adhesion parts 1031 are configured such that an orthogonal projection of each of the plurality of adhesion parts 1031 on the bottom surface 1041 of the light guide plate 104 is located outside orthogonal projections of the light beams 5 of the plurality of light emitting elements 1022 on the bottom surface 1041 of the light guide plate 104.

Figure 6A:
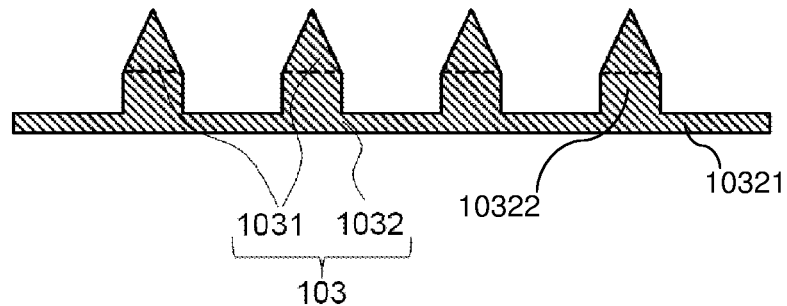
FIG. 6a is a schematic view of an adhesion assembly according to an embodiment of the present disclosure.

Optionally, in some embodiments of the present disclosure, referring to FIGS. 1, 5, and 6a, each of the plurality of light emitting elements 1022 is configured to emit a light beam 5, an orthogonal projection of the light beam 5 on the bottom surface 1041 of the light guide plate 104 has a first side 51 and a second side 52, and one of the first side 51 and the second side 52 of the orthogonal projection of the light beam 5 makes a predetermined angle with the other of the first side 51 and the second side 52 of the orthogonal projection of the light beam 5, and the predetermined angle is a beam angle θ of the light emitting element 1022, and each of the plurality of adhesion parts 1031 has a shape of an isosceles triangle, a base of the isosceles triangle is closer to the light entry face 1043 of the light guide plate 104 than a vertex angle of the isosceles triangle, and the vertex angle of the isosceles triangle is equal to the beam angle θ of the light emitting element 1022.

Optionally, as shown in FIGS. 1 and 5, in some embodiments, each of the plurality of adhesion parts 1031 has a shape of an isosceles triangle, a base of the isosceles triangle corresponds to an interval between two adjacent ones of the plurality of light emitting elements 1022, and a vertex angle α of the isosceles triangle is equal to the beam angle θ of the light emitting element.

In some embodiments, the light emitting element may be, for example, a light emitting diode (LED) with a beam angle. Each of the plurality of adhesion parts has the shape of the isosceles triangle, the base of the isosceles triangle corresponds to the interval between two adjacent ones of the plurality of light emitting elements, and the vertex angle of the isosceles triangle is equal to the beam angle of the light emitting element. With the above arrangement, the light beams emitted by the light emitting elements are further prevented from being irradiated on the adhesion parts, thereby reducing the loss of light.

In some embodiments, when the light emitting element has a relatively small size, an adhesion part having a rectangular shape may also be used in order to ensure a sufficient adhering strength. For example, in some embodiments, as shown in FIG. 6b, each of the plurality of adhesion parts 1031 has a rectangular shape, and each of the plurality of adhesion parts 1031 corresponds to the interval between two adjacent ones of the plurality of light emitting elements.

Figure 6B:
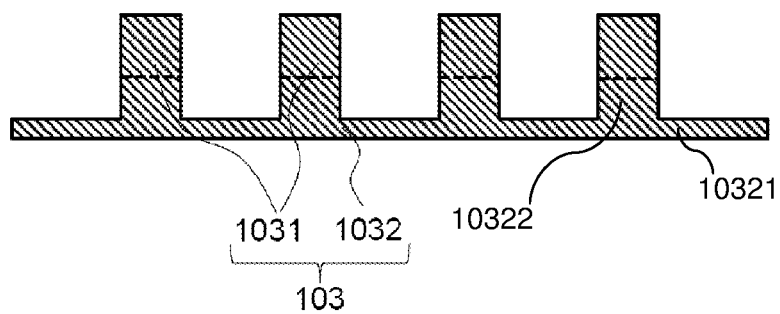
FIG. 6b is a schematic view of an adhesion assembly according to another embodiment of the present disclosure.
Figure 7:
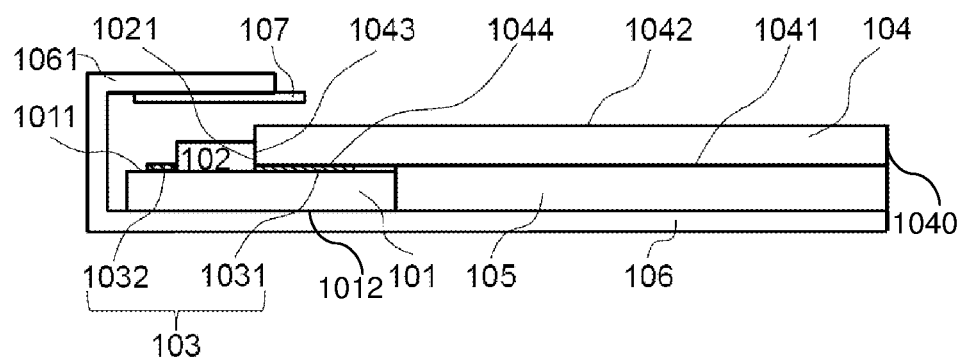
FIG. 7 is a schematic view showing a structure of a backlight module according to a still another embodiment of the present disclosure.

Optionally, in some embodiments of the present disclosure, referring to FIGS. 5-7, the adhesion assembly 103 further includes a connection part 1032 connecting the plurality of adhesion parts 1031. For example, the connection part 1032 includes a first strip portion 10321 extending in the first direction, and a plurality of second portions 10322 extending from the first strip portion 10321 to the plurality of adhesion parts 1031 and connected to the plurality of adhesion parts 1031, respectively, and the connection part 1032 is adhered to the support plate 101. According to some examples of the present disclosure, the plurality of light emitting elements 1022 are located between the first strip portion 10321 of the connection part 1032 and the light entry face 1043 of the light guide plate 104, and are arranged alternately with the plurality of second portions 10322 of the connection part 1032.

Optionally, as shown in FIGS. 5, 6a and 6b, in some embodiments, the adhesion assembly 103 further includes a connection part 1032 connecting the plurality of adhesion parts 1031.

In some embodiments, the adhesion assembly further includes a connection part configured to connect the plurality of adhesion parts. The connection part connects the plurality of adhesion parts such that the plurality of adhesion parts can be arranged in a predetermined positional relationship. For example, the plurality of adhesion parts are arranged at predetermined intervals and there are predetermined relative positional relationships between the plurality of adhesion parts and the light source. Thereby, not only a positional accuracy of the plurality of adhesion parts is improved, but a process of applying the adhesion assembly is also simplified. A surface of the connection part facing towards the support plate may be an adhesive surface. Of course, a surface of the connection part facing away from the support plate may also be an adhesive surface. In this case, the entire adhesion assembly may be made of a double-side adhesive tape. For example, in a process of applying the adhesion assembly to the first surface of the support plate, the adhesion assembly, as shown in FIG. 6a or 6b, as a whole may be aligned with a predetermined region of the support plate, so that the plurality of adhesion parts 1031 are arranged in a predetermined positional relationship.

In some embodiments, in a direction perpendicular to the light exit face 1021 of the light source 102, a length L of the at least one adhesion part 1031 may be adjusted according to an actual size of the backlight module. Specifically, in some embodiments, the adhesion part 1031 may be an adhesive tape or a double-side adhesive tape with a thickness of 0.03-0.05 mm.

With the above arrangement, an appropriate bonding strength can be maintained, and the loss of light is reduced as much as possible.

Optionally, in some embodiments, a material of the adhesion assembly includes an adhesive tape or an adhesive.

The adhesion assembly including the adhesive tape or the adhesive may be applied to the first surface of the support plate 101 by a process such as coating or printing.

Optionally, in some embodiments of the present disclosure, referring to FIG. 7, the backlight module 100 further includes: a reflection element 105 disposed on a side of the light guide plate 104 facing towards the support plate 101 and configured to reflect a light, exiting from the bottom surface 1041 of the light guide plate 104, into the light guide plate 104 through the bottom surface 1041.

Optionally, referring to FIG. 7, in some embodiments of the present disclosure, the backlight module 100 further includes: a back plate 106. The support plate 101 includes a second surface 1012 located opposite to the first surface 1011 and slidably disposed on a surface of the back plate 106.

Optionally, referring to FIGS. 1, 2, 3, 5 and 7, in some embodiments of the present disclosure, the support plate 101 is a circuit board and the light source 102 includes a plurality of light emitting elements 1022 fixed to the circuit board to be supplied with an electric power. For example, the support plate 101 is a flexible printed circuit board, the light source 102 includes a plurality of light emitting elements 1022 fixed to the flexible printed circuit board, and the flexible printed circuit board and the plurality of light emitting elements 1022 constitute a strip light. The light emitting element may be a light emitting diode.

Optionally, as shown in FIG. 7, in some embodiments, the backlight module 700 further includes a reflection element 105 disposed on a side of the light guide plate 104 close to the bottom surface 1041.

With the reflection element, a coefficient of utilization of the light of the light source can be further increased, and the loss of the light is reduced. The reflection element may be a reflector plate of which a reflection surface faces towards the bottom surface of the light guide plate. The reflection element may also be a reflection pattern disposed on the bottom surface of the light guide plate, so that light inside the light guide plate is reflected towards the light exit face of the light guide plate.

Optionally, as shown in FIG. 7, in some embodiments, the backlight module 700 further includes a back plate 106. The support plate 101 includes a second surface 1012 located opposite to the first surface 1011 and slidably disposed on a surface of the back plate 106.

For example, the light guide plate 104 may be fixed to the back plate 106. Since the second surface 1012 of the support plate 101 is slidably disposed on the surface of the back plate 106, the support plate 101 can be translated in a horizontal direction, shown in FIG. 7, together with the light entry face 1043 of the light guide plate 104. Therefore, even if the light guide plate 104 is deformed due to aging, the relative position between the light guide plate 104 and the light source 102 will not be changed.

In addition, as shown in FIG. 7, the back plate 106 may further include a bent part 1061 configured to block the light source 102, so that the light is prevented from leaking from the backlight module in a position where the light source is located. Optionally, a light blocking adhesive tape 107 may be disposed on a surface of the bent part 1061 facing towards the light source 102, so that the light is further prevented from leaking from the backlight module in the position where the light source is located.

Figure 8:
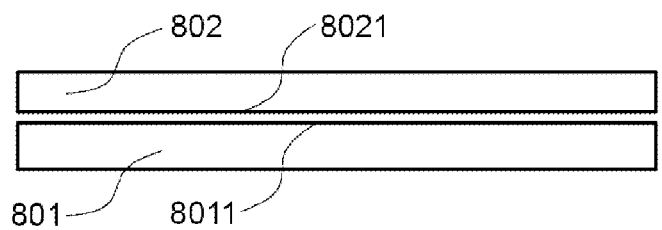
FIG. 8 is a schematic view showing a structure of a liquid crystal display apparatus according to an embodiment of the present disclosure.

In accordance with another aspect of embodiments of the present disclosure, there is provided a liquid crystal display apparatus 800. As shown in FIG. 8, the liquid crystal display apparatus 800 includes: the backlight module 801 of any one of the above embodiments; and a liquid crystal display panel 802 having a light entry face 8021. Referring to FIGS. 2 and 7, the light exit face of the light guide plate 104 of the backlight module 801 faces towards the light entry face 8021 of the liquid crystal display panel 802.

In accordance with some examples of the present disclosure, there is provided a liquid crystal display apparatus. As shown in FIG. 8, the liquid crystal display apparatus 800 includes the backlight module 801 according to any one of the above embodiments; and a liquid crystal display panel 802. A light exit face 8011 of the backlight module 801 faces towards the light entry face 8021 of the liquid crystal display panel 802. The liquid crystal display apparatus may include any products or parts having a displaying function, such as a mobile phone, a tablet computer, a TV, a display, a notebook computer, a digital frame, and a navigator. The embodiments of the backlight module may be referred to for implementations of the liquid crystal display apparatus and repeated contents are no longer described for the sake of brevity.

In accordance with still another aspect of embodiments of the present disclosure, there is provided a method of manufacturing a backlight module. Referring to FIGS. 1-3 and 5-7, the method of manufacturing the backlight module 100 according to the embodiment of the present disclosure includes: providing a support plate 101 including a first surface 1011; providing a light source 102 having a light exit face 1021 and configured to emit a light from the light exit face 1021, and fixing the light source 102 to the first surface 1011 of the support plate 101; providing a light guide plate 104, the light guide plate 104 including: a bottom surface 1041; a top surface 1042 located opposite to the bottom surface 1041 and serving as a light exit face of the light guide plate 104; and a side surface 1040 surrounding the bottom surface 1041 and the top surface 1042, a portion of the side surface 1040 serving as a light entry face 1043 of the light guide plate 104, and the light emitted by the light source 102 entering the light guide plate 104 through the light entry face 1043 of the light guide plate 104; disposing an adhesion assembly 103 on the first surface 1011 of the support plate 101, the adhesion assembly 103 including at least one adhesion part 1031, and the at least one adhesion part 1031 extending from the light exit face 1021 of the light source 102 in a direction away from the light source 102; or disposing the adhesion assembly 103 on the bottom surface 1041 of the light guide plate 104, the at least one adhesion part 1031 of the adhesion assembly 103 extending from the light entry face 1043 of the light guide plate 104 in a direction away from the light entry face 1043; and adhering the bottom surface 1041 of the light guide plate 104 to the first surface 1011 of the support plate 101 through the at least one adhesion part 1031 of the adhesion assembly 103.

In some embodiments of the present disclosure, referring to FIGS. 1-3, 5 and 7, the light entry face 1043 of the light guide plate 104 is in direct contact with the light exit face 1021 of the light source 102.

Figure 9:
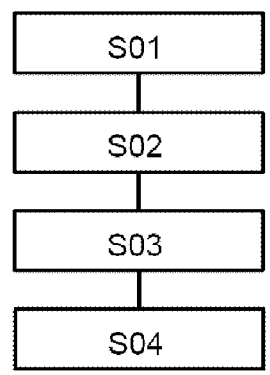
FIG. 9 is a flow diagram of a method of manufacturing a backlight module according to an embodiment of the present disclosure.

In accordance with some examples of the present disclosure, there is provided a method of manufacturing a backlight module. As shown in FIG. 9, the method of manufacturing the backlight module includes the following steps.

Figure 10A:
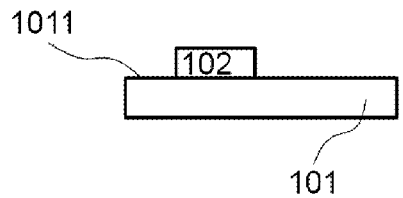
FIGS. 10a to 10d are schematic views showing structures of the backlight module formed in steps of the method of manufacturing the backlight module according to an embodiment of the present disclosure.

In a step S01, a support plate 101 is provided. The support plate 101 includes a first surface 1011 on which a light source 102 (as shown in FIG. 10a) is disposed.

Figure 10B:
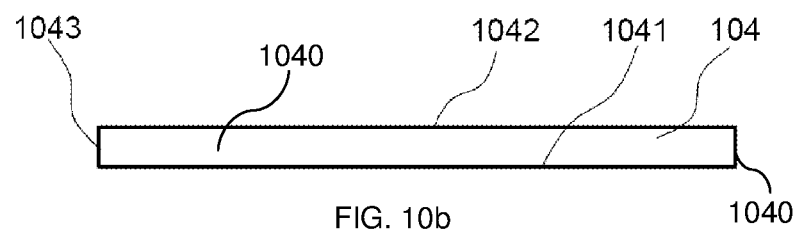

In a step S02, a light guide plate 104 is provided. The light guide plate 104 includes: a bottom surface 1041; a top surface 1042 opposite to the bottom surface 1041; and a side surface 1040 surrounding the bottom surface 1041 and the top surface 1042. A portion of the side surface 1040 serves as a light entry face 1043 of the light guide plate, and the top surface 1042 serves as a light exit face of the light guide plate (as shown in FIG. 10b).

Figure 10C:
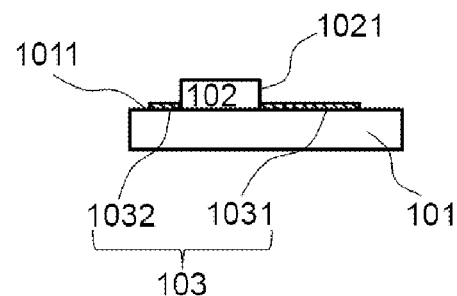

In a step S03, an adhesion assembly 103 is disposed on the first surface 1011 of the support plate 101. The adhesion assembly 103 includes at least one adhesion part 1031. Each adhesion part 1031 extends from the light exit face 1021 of the light source 102 in a direction away from the light source 102 (as shown in FIG. 10c).

In a step S04, the bottom surface 1041 of the light guide plate 104 is adhered to the first surface 1011 of the support plate 101 through the at least one adhesion part 1031. The light entry face 1043 of the light guide plate is in direct contact with the light exit face 1021 of the light source 102 (as shown in FIG. 2). Thereby, the backlight module as shown in FIG. 2 is obtained.

In the embodiments of the present disclosure, each adhesion part extends from the light exit face of the light source in the direction away from the light source, the bottom surface of the light guide plate is adhered to the first surface of the support plate 101 through the at least one adhesion part, and the light entry face of the light guide plate is in direct contact with the light exit face of the light source. With the above arrangement, an adhesion region where the light guide plate is in contact with the adhesion assembly can be as close to the light exit face of the light source as possible. Thereby, if the light entry face of the light guide plate is displaced, it will drive the light exit face of the light source to be displaced. Thereby, when the light guide plate is deformed due to a temperature variation or aging, the deformation will not change a relative position between the light entry face of the light guide plate and the light source.

Thereby, a luminance of the backlight module is increased as much as possible, and a light attenuation caused by aging is reduced.

In consideration of formations of the adhesion assembly such as those shown in FIGS. 6a and 6b, the adhesion assembly is disposed on the support plate so that relatively high production efficiency and accuracy can be obtained. In some embodiments of the present disclosure, the adhesion assembly may also be disposed on the light guide plate, and then the light guide plate and the support plate are adhered together through the adhesion assembly. Specifically, the step S03 in the above embodiment may be replaced with the following step S03'.

Figure 10D:
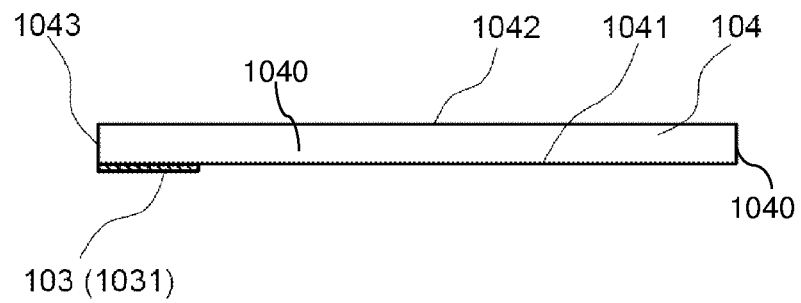

In the step S03', the adhesion assembly 103 is disposed on the bottom surface 1041 of the light guide plate 104. The adhesion assembly 103 includes at least one adhesion part 1031. Each adhesion part 1031 extends from the light entry face 1043 of the light guide plate 104 in a direction away from the light entry face 1043 (as shown in FIG. 10d).

Optionally, in some embodiments of the present disclosure, referring to FIGS. 1, 3, and 5-7, the adhesion assembly 103 includes a plurality of adhesion parts 1031 arranged in a first direction, the light source 102 includes a plurality of light emitting elements 1022 arranged in the first direction, and when viewed in a second direction perpendicular to the first direction, each of the plurality of adhesion parts 1031 is located between two adjacent ones of the plurality of light emitting elements 1022.

Optionally, in some embodiments of the present disclosure, referring to FIGS. 1 and 5, each of the plurality of light emitting elements 1022 is configured to emit a light beam 5, and the plurality of adhesion parts 1031 are configured such that an orthogonal projection of each of the plurality of adhesion parts 1031 on the bottom surface 1041 of the light guide plate 104 is located outside orthogonal projections of the light beams 5 of the plurality of light emitting elements 1022 on the bottom surface 1041 of the light guide plate 104.

Optionally, in some embodiments of the present disclosure, referring to FIGS. 1, 5, and 6a, each of the plurality of light emitting elements 1022 is configured to emit a light beam 5, an orthogonal projection of the light beam 5 on the bottom surface 1041 of the light guide plate 104 has a first side 51 and a second side 52, and one of the first side 51 and the second side 52 of the orthogonal projection of the light beam 5 makes a predetermined angle with the other of the first side 51 and the second side 52 of the orthogonal projection of the light beam 5, and the predetermined angle is a beam angle θ of the light emitting element 1022, and each of the plurality of adhesion parts 1031 has a shape of an isosceles triangle, a base of the isosceles triangle is closer to the light entry face 1043 of the light guide plate 104 than a vertex angle of the isosceles triangle, and the vertex angle of the isosceles triangle is equal to the beam angle θ of the light emitting element 1022.

Optionally, as shown in FIGS. 1 and 5, in some embodiments, the adhesion assembly 103 includes a plurality of adhesion parts 1031, the light source 102 includes a plurality of light emitting elements 1022, and each of the plurality of adhesion parts 1031 corresponds in position to an interval between two adjacent ones of the plurality of light emitting elements 1022.

In some embodiments of the present disclosure, a surface of the adhesion part facing towards the light guide plate may be an adhesive surface. Of course, a surface of the adhesion part facing towards the support plate may also be an adhesive surface. In this case, the adhesion part (or the adhesion assembly) may be made of a double-side adhesive tape. With the above arrangement, a bond between the light guide plate and the first surface of the support plate 101 is more stable. Each of the plurality of adhesion parts corresponds in position to the interval between two adjacent ones of the plurality of light emitting elements. Therefore, light beams emitted by the light emitting elements will not be substantially irradiated on the adhesion parts, reducing a loss of light. Of course, as shown in FIG. 3, the light guide plate 104 may also be bonded to the first surface 1011 of the support plate 101 by means of separate adhesion parts 1031.

Optionally, as shown in FIGS. 1 and 5, in some embodiments, each of the plurality of adhesion parts 1031 has a shape of an isosceles triangle, a base of the isosceles triangle corresponds to an interval between two adjacent ones of the plurality of light emitting elements 1022, and a vertex angle α of the isosceles triangle is equal to the beam angle θ of the light emitting element.

In some embodiments, the light emitting element may be, for example, a light emitting diode (LED) with a beam angle. Each of the plurality of adhesion parts has the shape of the isosceles triangle, the base of the isosceles triangle corresponds to the interval between two adjacent ones of the plurality of light emitting elements, and the vertex angle of the isosceles triangle is equal to the beam angle of the light emitting element. With the above arrangement, the light beams emitted by the light emitting elements are further prevented from being irradiated on the adhesion parts, thereby reducing the loss of light.

In some embodiments of the present disclosure, referring to FIGS. 5-7, the adhesion assembly 103 further includes a connection part 1032 connecting the plurality of adhesion parts 1031. For example, the connection part 1032 includes a first strip portion 10321 extending in the first direction, and a plurality of second portions 10322 extending from the first strip portion 10321 to the plurality of adhesion parts 1031 and connected to the plurality of adhesion parts 1031, respectively, and the connection part 1032 is adhered to the support plate 101. According to some examples of the present disclosure, the plurality of light emitting elements 1022 are located between the first strip portion 10321 of the connection part 1032 and the light entry face 1043 of the light guide plate 104, and are arranged alternately with the plurality of second portions 10322 of the connection part 1032.

Optionally, as shown in FIGS. 5, 6a and 6b, in some embodiments, the adhesion assembly 103 further includes a connection part 1032 connecting the plurality of adhesion parts 1031.

In some embodiments, the adhesion assembly further includes a connection part configured to connect the plurality of adhesion parts. The connection part connects the plurality of adhesion parts such that the plurality of adhesion parts can be arranged in a predetermined positional relationship. For example, the plurality of adhesion parts are arranged at predetermined intervals and there are predetermined relative positional relationships between the plurality of adhesion parts and the light source. Thereby, not only a positional accuracy of the plurality of adhesion parts is improved, but a process of applying the adhesion assembly is also simplified. A surface of the connection part facing towards the support plate may be an adhesive surface. Of course, a surface of the connection part facing away from the support plate may also be an adhesive surface. In this case, the entire adhesion assembly may be made of a double-side adhesive tape. For example, in a process of applying the adhesion assembly to the first surface of the support plate, the adhesion assembly, as shown in FIG. 6a or 6b, as a whole may be aligned with a predetermined region of the support plate, so that the plurality of adhesion parts 1031 are arranged in a predetermined positional relationship.

In some embodiments of the present disclosure, referring to FIG. 7, the method further includes: disposing, on a side of the light guide plate 104 facing towards the support plate 101, a reflection element 105 configured to reflect a light, exiting from the bottom surface 1041 of the light guide plate 104, into the light guide plate 104 through the bottom surface 1041.

Referring to FIG. 7, in some embodiments of the present disclosure, the method further includes: providing a back plate 106. The support plate 101 includes a second surface 1012 located opposite to the first surface 1011 and slidably disposed on a surface of the back plate 106.

Referring to FIGS. 1-3, 5 and 7, in some embodiments of the present disclosure, providing the support plate 101 and providing the light source 102 collectively include: providing a light source module. The light source module includes: a circuit board serving as the support plate 101; and a plurality of light emitting elements 1022 serving as the light source 102 and fixed to the circuit board to be supplied with an electric power. For example, providing the support plate 101 and providing the light source 102 collectively include: providing a strip light. The strip light includes: a flexible printed circuit board serving as the support plate 101; and a plurality of light emitting elements 1022 serving as the light source 102 and fixed to the flexible printed circuit board.

Optionally, in some embodiments, the method further includes: disposing a reflection element 105 on a side of the light guide plate 104 close to the bottom surface 1042 (as shown in FIG. 7).

With the reflection element, a coefficient of utilization of the light of the light source can be further increased, and the loss of the light is reduced. The reflection element may be a reflector plate of which a reflection surface faces towards the bottom surface of the light guide plate. The reflection element may also be a reflection pattern disposed on the bottom surface of the light guide plate, so that light inside the light guide plate is reflected towards the light exit face of the light guide plate.

Optionally, in some embodiments, the method further includes: providing a back plate 106. The support plate 101 includes a second surface 1012 located opposite to the first surface 1011 and slidably disposed on a surface of the back plate 106 (as shown in FIG. 7).

With the backlight module, the liquid crystal display apparatus, and the method of manufacturing the backlight module according to the embodiments of the present disclosure, each adhesion part extends from the light exit face of the light source in the direction away from the light source, the bottom surface of the light guide plate is adhered to the first surface of the support plate 101 through the at least one adhesion part, and the light entry face of the light guide plate is in direct contact with the light exit face of the light source. With the above arrangement, an adhesion region where the light guide plate is in contact with the adhesion assembly can be as close to the light exit face of the light source as possible. Thereby, if the light entry face of the light guide plate is displaced, it will drive the light exit face of the light source to be displaced. Thereby, when the light guide plate is deformed due to a temperature variation or aging, the deformation will not change a relative position between the light entry face of the light guide plate and the light source. Thereby, a luminance of the backlight module is increased as much as possible, and a light attenuation caused by aging is reduced.

The indefinite articles "a" and "an" used in the description and claims of this disclosure should be understood to mean "at least one" unless an explicit indication to the contrary is given.

It should also be understood that, unless clearly indicated to the contrary, in any method that includes more than one step or action, the order of the steps or actions of the method need not be limited to the order of the steps or actions of the method described.

Although some exemplary embodiments of the present disclosure have been shown above, it would be appreciated by a person skilled in the art that modifications may be made therein without departing from the principle and spirit of the present disclosure, the scope of which is defined in the appended claims and their equivalents.

What is claimed is:

1. A backlight module comprising:
   a support plate comprising a first surface;
   a light source fixed to the first surface of the support plate, having a light exit face, and configured to emit a light from the light exit face;
   an adhesion assembly disposed on the first surface of the support plate, and comprising at least one adhesion part extending from the light exit face of the light source in a direction away from the light source;
   a light guide plate comprising:
      a bottom surface adhered to the first surface of the support plate through the at least one adhesion part of the adhesion assembly;
      a top surface located opposite to the bottom surface and serving as a light exit face of the light guide plate; and
      a side surface surrounding the bottom surface and the top surface,
      wherein a portion of the side surface serves as a light entry face of the light guide plate, and the light emitted by the light source enters the light guide plate through the light entry face of the light guide plate, and
      wherein the light entry face of the light guide plate is in direct contact with the light exit face of the light source, and an orthographic projection of an edge of the adhesion part proximate to the light entry face on the support plate is aligned with an orthographic projection of the light entry face on the support plate; and
   a back plate comprising:
      a bent part configured to block the light source, wherein the orthographic projection of the light entry face on the support plate is within an orthographic projection of the bent part on the support plate;
   wherein the adhesion assembly comprises a plurality of the adhesion parts arranged in a first direction, the light source comprises a plurality of light emitting elements arranged in the first direction, and when viewed in a second direction perpendicular to the first direction, each of the plurality of adhesion parts is located between two adjacent ones of the plurality of light emitting elements.

2. The backlight module of claim 1, wherein:
   the support plate comprises a circuit board, and the light source comprises a plurality of light emitting elements fixed to the circuit board so as to be supplied with an electric power.

3. A liquid crystal display apparatus comprising:
   the backlight module of claim 1; and
   a liquid crystal display panel having a light entry face, wherein the light exit face of the light guide plate of the backlight module faces towards the light entry face of the liquid crystal display panel.

4. The backlight module of claim 1, wherein:
each of the plurality of light emitting elements is configured to emit a light beam, an orthogonal projection of the light beam on the bottom surface of the light guide plate has a first side and a second side, the first side and the second side of the orthogonal projection of the light beam make a predetermined angle with each other, and the predetermined angle is a beam angle of the light emitting element, and
each of the plurality of adhesion parts has a shape of an isosceles triangle, a base of the isosceles triangle is closer to the light entry face of the light guide plate than a vertex angle of the isosceles triangle, and the vertex angle of the isosceles triangle is equal to the beam angle of the light emitting element.

5. The backlight module of claim 1, wherein:
each of the plurality of light emitting elements is configured to emit a light beam, and
the plurality of adhesion parts are configured such that an orthogonal projection of each of the plurality of adhesion parts on the bottom surface of the light guide plate is located outside orthogonal projections of the light beams of the plurality of light emitting elements on the bottom surface of the light guide plate.

6. The backlight module of claim 1, wherein:
the adhesion assembly further comprises a connection part connecting the plurality of adhesion parts.

7. The backlight module of claim 6, wherein:
the connection part comprises a first strip portion extending in the first direction, and a plurality of second portions extending from the first strip portion to the plurality of adhesion parts and connected to the plurality of adhesion parts, respectively, and the connection part is adhered to the support plate.

8. The backlight module of claim 7, wherein:
the plurality of light emitting elements are located between the first strip portion of the connection part and the light entry face of the light guide plate, and are arranged alternately with the plurality of second portions of the connection part.

9. The backlight module of claim 1, wherein:
a material of the adhesion assembly comprises an adhesive tape or an adhesive.

10. The backlight module of claim 1, further comprising:
a reflection element disposed on a side of the light guide plate facing towards the support plate and configured to reflect a light, exiting from the bottom surface of the light guide plate, into the light guide plate through the bottom surface.

11. The backlight module of claim 1,
wherein the support plate comprises a second surface located opposite to the first surface and slidably disposed on a surface of the back plate.

12. A method of manufacturing a backlight module, comprising:
providing a support plate comprising a first surface;
providing a light source having a light exit face and configured to emit a light from the light exit face, and fixing the light source to the first surface of the support plate;
providing a light guide plate, the light guide plate comprising: a bottom surface; a top surface located opposite to the bottom surface and serving as a light exit face of the light guide plate; and a side surface surrounding the bottom surface and the top surface, a portion of the side surface serving as a light entry face of the light guide plate, and the light emitted by the light source entering the light guide plate through the light entry face of the light guide plate;
disposing an adhesion assembly on the first surface of the support plate, the adhesion assembly comprising at least one adhesion part, and the at least one adhesion part extending from the light exit face of the light source in a direction away from the light source; or disposing the adhesion assembly on the bottom surface of the light guide plate, the at least one adhesion part of the adhesion assembly extending from the light entry face of the light guide plate in a direction away from the light entry face, wherein the adhesion assembly comprises a plurality of the adhesion parts arranged in a first direction, the light source comprises a plurality of light emitting elements arranged in the first direction, and when viewed in a second direction perpendicular to the first direction, each of the plurality of adhesion parts is located between two adjacent ones of the plurality of light emitting elements;
adhering the bottom surface of the light guide plate to the first surface of the support plate through the at least one adhesion part of the adhesion assembly, such that the light entry face of the light guide plate is in direct contact with the light exit face of the light source, and an orthographic projection of an edge of the adhesion part proximate to the light entry face on the support plate is aligned with an orthographic projection of the light entry face on the support plate; and
providing a back plate comprising a bent part configured to block the light source, the orthographic projection of the light entry face on the support plate being within an orthographic projection of the bent part on the support plate.

13. The method of claim 12, wherein:
each of the plurality of light emitting elements is configured to emit a light beam, and
the plurality of adhesion parts are configured such that an orthogonal projection of each of the plurality of adhesion parts on the bottom surface of the light guide plate is located outside orthogonal projections of the light beams of the plurality of light emitting elements on the bottom surface of the light guide plate.

14. The method of claim 12, wherein:
the adhesion assembly further comprises a connection part connecting the plurality of adhesion parts.

15. The method of claim 14, wherein:
the connection part comprises a first strip portion extending in a first direction, and a plurality of second portions extending from the first strip portion to the plurality of adhesion parts and connected to the plurality of adhesion parts, respectively, and the connection part is adhered to the support plate.

16. The method of claim 15, wherein:
the plurality of light emitting elements are located between the first strip portion of the connection part and the light entry face of the light guide plate, and are arranged alternately with the plurality of second portions of the connection part.

17. The method of claim 12,
wherein the support plate comprises a second surface located opposite to the first surface and slidably disposed on a surface of the back plate.

* * * * *